United States Patent
Zhang et al.

(10) Patent No.: US 12,452,568 B2
(45) Date of Patent: Oct. 21, 2025

(54) METHOD FOR SWITCHING OPERATING MODE OF USER EQUIPMENT, SIGNAL PROCESSING METHOD FOR NETWORK DEVICE, OPTICAL MODULE, ELECTRONIC DEVICE, STORAGE MEDIUM, AND COMMUNICATION SYSTEM

(71) Applicant: Ruijie Networks Co., Ltd., Fuzhou (CN)

(72) Inventors: Xiaofeng Zhang, Fujian (CN); Longshun Wang, Fujian (CN); Mingzhen Zhang, Fujian (CN)

(73) Assignee: Ruijie Networks Co., Ltd., Fujian (CN)

( * ) Notice: Subject to any disclaimer, the term of this patent is extended or adjusted under 35 U.S.C. 154(b) by 0 days.

(21) Appl. No.: 19/228,294

(22) Filed: Jun. 4, 2025

(65) Prior Publication Data
US 2025/0301246 A1    Sep. 25, 2025

Related U.S. Application Data

(63) Continuation of application No. PCT/CN2024/135281, filed on Nov. 28, 2024.

(30) Foreign Application Priority Data

Dec. 6, 2023 (CN) .......................... 202311672253.9

(51) Int. Cl.
H04Q 11/00 (2006.01)
(52) U.S. Cl.
CPC . *H04Q 11/0067* (2013.01); *H04Q 2011/0064* (2013.01); *H04Q 2011/0079* (2013.01)
(58) Field of Classification Search
CPC .................................................. H04Q 11/0067
See application file for complete search history.

(56) References Cited

U.S. PATENT DOCUMENTS

2020/0343975 A1   10/2020  Deng et al.
2024/0414459 A1*  12/2024  Geng ................. H04Q 11/0067

FOREIGN PATENT DOCUMENTS

CN        113382324 A      9/2021
CN        115914893 A      4/2023
(Continued)

OTHER PUBLICATIONS

Written Opinion and ISR for PCT/CN2024/135281 dated Jan. 3, 2025.

*Primary Examiner* — Shi K Li
(74) *Attorney, Agent, or Firm* — ArentFox Schiff LLP; Michael Fainberg

(57) ABSTRACT

Embodiments of this application disclose a method and an apparatus for switching an operating mode of user equipment, a signal processing method and apparatus for a network device, an optical module, an electronic device, a storage medium, and a communication system, and relate to the field of communication technologies. In the embodiments of this application, a user equipment interconnection request sent by a network device is obtained, the user equipment interconnection request is parsed to obtain an expected operating mode message carrying an expected operating mode of user equipment, and when a message type corresponding to the expected operating mode message is different from a message type used when the user equipment is in a default operating mode, the user equipment is switched from the default operating mode to the expected operating mode based on the expected operating mode message.

18 Claims, 8 Drawing Sheets

(56) References Cited

FOREIGN PATENT DOCUMENTS

CN 116546351 A 8/2023
KR 10-2007-0061001 A 6/2007

* cited by examiner

METHOD FOR SWITCHING OPERATING MODE OF USER EQUIPMENT, SIGNAL PROCESSING METHOD FOR NETWORK DEVICE, OPTICAL MODULE, ELECTRONIC DEVICE, STORAGE MEDIUM, AND COMMUNICATION SYSTEM

CROSS-REFERENCE TO RELATED APPLICATIONS

This application is a continuation of International Application No. PCT/CN2024/135281, filed on Nov. 28, 2024, which claims priority to Chinese Patent Application No. 202311672253.9, filed with the China National Intellectual Property Administration on Dec. 6, 2023 and entitled "METHOD AND APPARATUS FOR SWITCHING OPERATING MODE OF USER EQUIPMENT, OPTICAL MODULE, AND ELECTRONIC DEVICE", which are incorporated herein by reference in their entireties.

TECHNICAL FIELD

This application relates to the field of communication technologies, and in particular, to a method for switching an operating mode of user equipment, a signal processing method for a network device, an optical module, an electronic device, a storage medium, and a communication system.

BACKGROUND

As shown in FIG. 1, a passive optical network (PON) system usually includes an optical line terminal (OLT) device on a central office side (a server side, which may be, for example, a service provider or an operator), an optical network unit (ONU) device on a user side, and an optical distribution network (ODN). The PON system usually has a point-to-multipoint network structure. The ODN includes a single-mode optical fiber and passive optical components such as an optical splitter (also referred to as a splitter) and an optical connector. The ODN may provide an optical transmission medium for a physical connection between the OLT and the ONU.

In addition, the ONU device is a user-side device, and a large quantity of ONU devices may be deployed in the PON system. Therefore, to reduce costs of the ONU devices, an optical module that is in the ONU device and that is connected to the OLT device is fastened to the ONU device through a broadband optical subassembly (BOSA) for use.

SUMMARY

Embodiments of this application provide a method for switching an operating mode of user equipment, a signal processing method for a network device, an optical module, an electronic device, a storage medium, and a communication system.

According to a first aspect, an embodiment of this application provides a method for switching an operating mode of user equipment. The method includes:

obtaining a user equipment interconnection request sent by a network device;

parsing the user equipment interconnection request to obtain an expected operating mode message carrying an expected operating mode of the user equipment; and if a message type corresponding to the expected operating mode message is different from a message type used when the user equipment is in a default operating mode, switching the user equipment from the default operating mode to the expected operating mode based on the expected operating mode message, where the default operating mode is used to indicate that the user equipment uses uplink bandwidth in a time division multiplexing mode in a passive optical network PON.

In an optional embodiment, determining that the message type corresponding to the expected operating mode message is different from the message type used when the user equipment is in the default operating mode includes:

if a message protocol type corresponding to the expected operating mode message is different from a message protocol type used when the user equipment is in the default operating mode, determining that the message type corresponding to the expected operating mode message is different from the message type used when the user equipment is in the default operating mode.

In the foregoing embodiment, according to different message protocol types used for messages in different operating modes, it can be quickly determined whether the message type corresponding to the expected operating mode message is different from the message type used when the user equipment is in the default operating mode, to improve efficiency of subsequent operating mode switching.

In an optional embodiment, the message protocol type corresponding to the expected operating mode message is a non-multi-point control protocol MPCP type, and the message protocol type used when the user equipment is in the default operating mode is an MPCP type.

In the foregoing embodiment, the MPCP is usually a point-to-multipoint interconnection scenario, and the MPCP is used in a scenario of point-to-multipoint interconnection between a conventional OLT device and user equipment. Therefore, if the message protocol type corresponding to the foregoing operating mode message is not the MPCP type, it can be quickly determined that the message type corresponding to the expected operating mode message is different from the message type used when the user equipment is in the default operating mode, so that whether an operating mode of the user equipment needs to be switched can be quickly determined subsequently.

In an optional embodiment, if the following conditions are met, it is determined that the user equipment is in the default operating mode:

an optical port of the user equipment is in a PON mode; and a PON optical module of the user equipment is in a non-light-emitting state.

In the foregoing embodiment, whether the user equipment is in the default operating mode can be accurately and quickly determined.

In an optional embodiment, the switching the user equipment from the default operating mode to the expected operating mode includes:

switching the optical port of the user equipment from the PON mode to an Ethernet mode;

enabling a media access control MAC address forwarding capability of the user equipment; and indicating the PON optical module of the user equipment to be in a light-emitting state.

In the foregoing embodiment, when it is determined that the message type corresponding to the expected operating mode message is different from the message type used when the user equipment is in the default operating mode, the user equipment may be switched from the default operating mode to the expected operating mode, so that operating mode diversity of the user equipment is improved. In addition, full-bandwidth use of uplink bandwidth resources by the user equipment is implemented by switching the user equipment from the default operating mode to the expected operating mode.

In an optional embodiment, the method further includes:
when it is determined that the user equipment receives an optical signal sent by the network device, continually recording an MPCP message reception status of the user equipment; and
if the MPCP message reception status indicates that the user equipment receives no MPCP message sent by the network device within a specified time range, switching the user equipment from the default operating mode to the expected operating mode.

In the foregoing embodiment, even if the user equipment receives no expected operating mode message, the user equipment may be automatically switched from the default operating mode to the expected operating mode when it is determined that the user equipment is capable of receiving an optical signal sent by the network device and MPCP message reception times out.

In an optional embodiment, after the switching the user equipment from the default operating mode to the expected operating mode, the method further includes:
switching the user equipment from the expected operating mode to the default operating mode in response to an operating mode initialization operation of the user equipment; or
when it is determined that the user equipment detects that the network device sends an MPCP message, switching the user equipment from the expected operating mode to the default operating mode.

In the foregoing embodiment, switching of the user equipment between two operating modes, that is, the expected operating mode and the default operating mode, is implemented, and flexibility of operating mode switching of the user equipment is also improved.

In an optional embodiment, the switching the user equipment from the expected operating mode to the default operating mode includes:
sending an access registration request to the network device, and receiving an access registration response returned by the network device based on the access registration request; and
if the access registration response indicates that the user equipment is successfully registered with the network device, switching the user equipment from the expected operating mode to the default operating mode.

In the foregoing embodiment, the user equipment is switched from the expected operating mode back to the default operating mode based on the access registration request and the access registration response indicating that the user equipment is successfully registered with the network device.

In an optional embodiment, the method further includes:
if the user equipment is in the default operating mode, indicating an optical splitter to attenuate an optical signal transmitted by the PON optical module of the user equipment and then send the optical signal to the network device.

In an optional embodiment, the method further includes:
if the user equipment is in the expected operating mode, sending, to the network device directly through an optical fiber, an optical signal transmitted by the PON optical module of the user equipment.

In the foregoing embodiment, optical signal transmission modes are respectively set for different operating modes of the user equipment, to ensure operating mode diversity and use flexibility of the user equipment to some extent.

According to a second aspect, an embodiment of this application further provides a signal processing method for a network device. The method includes:
receiving an optical signal sent by user equipment in an expected operating mode through a PON optical module; and
performing, by an optical module of the network device, power processing on the received optical signal based on reception sensitivity of the optical module and then performing optical-to-electrical conversion, where
the expected operating mode is different from a default operating mode of the user equipment, and the default operating mode is used to indicate that the user equipment uses uplink bandwidth in a time division multiplexing mode in a passive optical network PON.

In an optional embodiment, the performing, by an optical module of the network device, power processing on the received optical signal based on reception sensitivity of the optical module includes:
performing power attenuation on the optical signal until power of the optical signal falls within a range of the reception sensitivity.

In an optional embodiment, before the receiving an optical signal sent by user equipment in an expected operating mode through a PON optical module, the method further includes:
sending a user equipment interconnection request to the user equipment through the optical module, where the user equipment interconnection request carries an expected operating mode message for the expected operating mode of the user equipment, and a message type corresponding to the expected operating mode message is different from a message type used when the user equipment is in the default operating mode.

In the foregoing embodiment, a hardware structure of the network device is improved, so that the network device can receive, directly through an optical fiber and the customized optical module, the optical signal sent by the user equipment in the expected operating mode through the PON optical module, and send the user equipment interconnection request to the user equipment through the customized optical module, to support operating mode diversity of the user equipment.

In an optional embodiment, that a message type corresponding to the expected operating mode message is different from a message type used when the user equipment is in the default operating mode includes:
if a message protocol type corresponding to the expected operating mode message is different from a message protocol type used when the user equipment is in the default operating mode, determining that the message type corresponding to the expected operating mode message is different from the message type used when the user equipment is in the default operating mode.

According to a third aspect, an embodiment of this application further provides an apparatus for switching an operating mode of user equipment. The apparatus includes:
a message obtaining module, configured to obtain a user equipment interconnection request sent by a network device, and parse the user equipment interconnection request to obtain an expected operating mode message carrying an expected operating mode of the user equipment; and a mode switching module, configured to: if a message type corresponding to the expected operating mode message is different from a message type used when the user equipment is in a default operating mode, switch the user equipment from the default operating mode to the expected operating mode based on the expected operating mode message, where the default operating mode is used to indicate that the user equipment uses uplink bandwidth in a time division multiplexing mode in a passive optical network PON.

In an optional embodiment, determining that the message type corresponding to the expected operating mode message is different from the message type used when the user equipment is in the default operating mode includes:
if a message protocol type corresponding to the expected operating mode message is different from a message protocol type used when the user equipment is in the default operating mode, determining that the message type corresponding to the expected operating mode message is different from the message type used when the user equipment is in the default operating mode.

In an optional embodiment, the message protocol type corresponding to the expected operating mode message is a non-multi-point control protocol MPCP type, and the message protocol type used when the user equipment is in the default operating mode is an MPCP type.

In an optional embodiment, if the following conditions are met, it is determined that the user equipment is in the default operating mode:
an optical port of the user equipment is in a PON mode; and
a PON optical module of the user equipment is in a non-light-emitting state.

In an optional embodiment, when switching the user equipment from the default operating mode to the expected operating mode, the mode switching module is specifically configured to:
switch the optical port of the user equipment from the PON mode to an Ethernet mode;
enable a media access control MAC address forwarding capability of the user equipment; and
indicate the PON optical module of the user equipment to be in a light-emitting state.

In an optional embodiment, the mode switching module is further configured to:
when it is determined that the user equipment receives an optical signal sent by the network device, continually record an MPCP message reception status of the user equipment; and
if the MPCP message reception status indicates that the user equipment receives no MPCP message sent by the network device within a specified time range, switch the user equipment from the default operating mode to the expected operating mode.

In an optional embodiment, after switching the user equipment from the default operating mode to the expected operating mode, the mode switching module is further configured to:
switch the user equipment from the expected operating mode to the default operating mode in response to an operating mode initialization operation of the user equipment; or
when it is determined that the user equipment detects that the network device sends an MPCP message, switch the user equipment from the expected operating mode to the default operating mode.

In an optional embodiment, when switching the user equipment from the expected operating mode to the default operating mode, the mode switching module is specifically configured to:
send an access registration request to the network device, and receive an access registration response returned by the network device based on the access registration request; and
if the access registration response indicates that the user equipment is registered with and accesses the network device, switch the user equipment from the expected operating mode to the default operating mode.

In an optional embodiment, the apparatus for switching an operating mode of user equipment further includes a signal sending module, and the signal sending module is specifically configured to:
if the user equipment is in the default operating mode, indicate an optical splitter to attenuate an optical signal transmitted by the PON optical module of the user equipment and then send the optical signal to the network device.

In an optional embodiment, the apparatus for switching an operating mode of user equipment further includes a signal sending module, and the signal sending module is specifically configured to:
if the user equipment is in the expected operating mode, send, to the network device directly through an optical fiber, an optical signal transmitted by the PON optical module of the user equipment.

According to a fourth aspect, an embodiment of this application further provides a signal processing apparatus for a network device. The apparatus includes:
a signal processing module, configured to: receive an optical signal sent by user equipment in an expected operating mode through a PON optical module; and perform power processing on the received optical signal based on reception sensitivity of an optical module of the network device and then perform optical-to-electrical conversion, where
the expected operating mode is different from a default operating mode of the user equipment, and the default operating mode is used to indicate that the user equipment uses uplink bandwidth in a time division multiplexing mode in a passive optical network PON.

In an optional embodiment, before receiving the optical signal sent by the user equipment in the expected operating mode through the PON optical module, the signal processing apparatus for a network device further includes an information sending module, and the information sending module is specifically configured to:
send a user equipment interconnection request to the user equipment through the optical module, where the user equipment interconnection request carries an expected operating mode message for the expected operating mode of the user equipment, and a message type corresponding to the expected operating mode message is different from a message type used when the user equipment is in the default operating mode.

According to a fifth aspect, an embodiment of this application further provides an optical module. The optical module is mounted in a network device, and the optical module is directly connected to user equipment in an expected operating mode through an optical fiber, including:
The optical module is configured to: when an optical signal sent by the user equipment through a PON optical module is received, perform power processing on the received optical signal based on reception sensitivity of the optical module and then perform optical-to-electrical conversion, where the expected operating mode is different from a default operating mode of the user equipment, and the default operating mode is used to indicate that the user equipment uses uplink bandwidth in a time division multiplexing mode in a passive optical network PON.

In an optional embodiment, the optical module is further configured to:

send a user equipment interconnection request to the user equipment, where the user equipment interconnection request carries an expected operating mode message for the expected operating mode of the user equipment, and a message type corresponding to the expected operating mode message is different from a message type used when the user equipment is in the default operating mode.

According to a sixth aspect, this application provides an electronic device, including a processor and a memory. The memory stores program code. When the program code is executed by the processor, the processor is enabled to perform the steps of the method for switching an operating mode of user equipment according to the first aspect, or the steps of the signal processing method for a network device according to the second aspect.

According to a seventh aspect, this application provides a computer-readable storage medium, including program code. When the program code is run on an electronic device, the program code is used to enable the electronic device to perform the steps of the method for switching an operating mode of user equipment according to the first aspect, or the steps of the signal processing method for a network device according to the second aspect.

According to an eighth aspect, this application provides a computer program product. When the computer program product is invoked by a computer, the computer is enabled to perform the steps of the method for switching an operating mode of user equipment according to the first aspect, or the steps of the signal processing method for a network device according to the second aspect.

According to a ninth aspect, this application provides a communication system, including user equipment and a network device.

The user equipment is configured to: obtain a user equipment interconnection request sent by a network device; parse the user equipment interconnection request to obtain an expected operating mode message carrying an expected operating mode of the user equipment; if a message type corresponding to the expected operating mode message is different from a message type used when the user equipment is in a default operating mode, switch the user equipment from the default operating mode to the expected operating mode based on the expected operating mode message; and after the user equipment is switched to the expected operating mode, send an optical signal to the network device through a PON optical module, where the default operating mode is used to indicate that the user equipment uses uplink bandwidth in a time division multiplexing mode in a passive optical network PON.

The network device is configured to: when the optical signal sent by the user equipment in the expected operating mode through the PON optical module is received, perform, through an optical module of the network device, power processing on the received optical signal based on reception sensitivity of the optical module and then perform optical-to-electrical conversion, and send the user equipment interconnection request to the user equipment through the optical module.

In the method for switching an operating mode of user equipment in the embodiments of this application, a user equipment interconnection request sent by a network device is obtained, the user equipment interconnection request is parsed to obtain an expected operating mode message carrying an expected operating mode of user equipment, and if a message type corresponding to the expected operating mode message is different from a message type used when the user equipment is in a default operating mode, the user equipment is switched from the default operating mode to the expected operating mode based on the expected operating mode message. In this way, the user equipment not only can serve as a conventional ONU device to perform point-to-multipoint interconnection with the network device, but also can implement point-to-point interconnection with the network device. This effectively mitigates a problem that conventional user equipment has a mono operating mode and low use flexibility, and therefore improves operating mode diversity and use flexibility of the conventional user equipment.

In addition, other features and advantages of this application are described later in this specification, and are partially apparent from this specification or understood through implementation of this application. Objectives and other advantages of this application may be achieved and obtained by using a structure particularly specified in the described specification, claims, and accompanying drawings.

BRIEF DESCRIPTION OF DRAWINGS

To describe the technical solutions in the embodiments of the present invention more clearly, the following briefly describes the accompanying drawings for describing the embodiments. Apparently, the accompanying drawings in the following descriptions show merely some embodiments of the present invention, and a person of ordinary skill in the art may still derive other drawings from these accompanying drawings without creative efforts.

DESCRIPTION OF EMBODIMENTS

Figure 1:
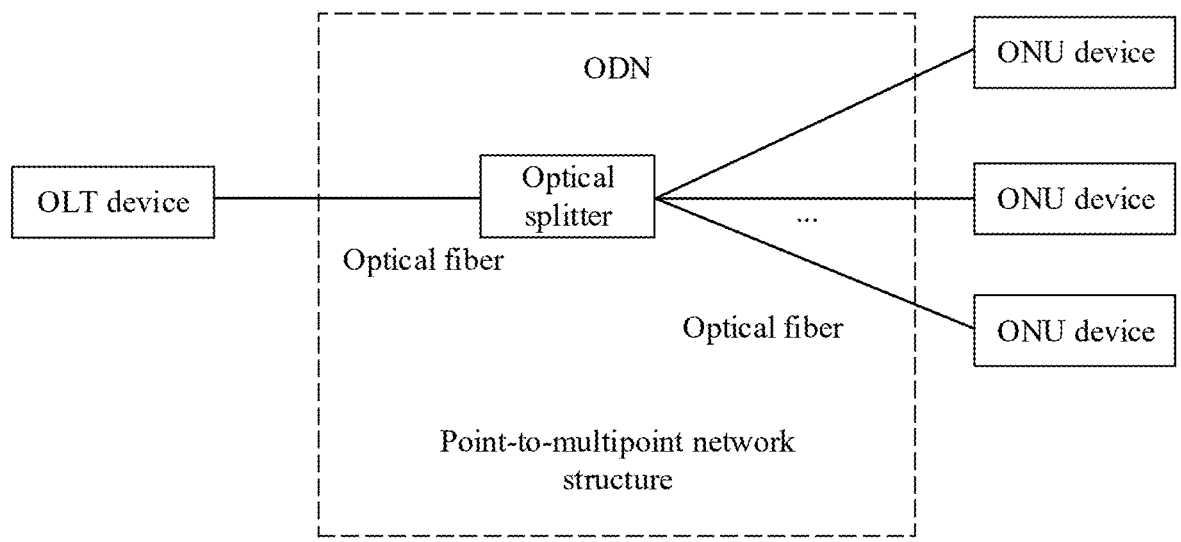
FIG. 1 is a schematic diagram of a structure of a PON system according to an embodiment of this application.

To make the objectives, technical solutions, and advantages of the embodiments of this application clearer, the following clearly and thoroughly describes the technical solutions of this application with reference to the accompanying drawings in the embodiments of this application. Apparently, the described embodiments are some but not all of the embodiments of this application. All other embodiments obtained by a person of ordinary skill in the art based on the embodiments described in this application document without creative efforts shall fall within the protection scope of the technical solutions of this application.

It should be noted that "a plurality of" in the descriptions of this application is understood as "at least two". The term "and/or" describes an association relationship between associated objects and represents that three relationships may exist. For example, A and/or B may represent the following three cases: Only A exists, both A and B exist, and only B exists. A connection between A and B may represent two cases: A is directly connected to B, and A is connected to B through C. In addition, in the descriptions of this application, the terms "first", "second", and the like are used only for distinguishing descriptions, but cannot be understood as an indication or implication of relative importance, or as an indication or implication of a sequence.

In addition, in the technical solutions of this application, collection, dissemination, use, and the like of data meet requirements of related national laws and regulations.

For ease of understanding by a person skilled in the art, some technical terms in the embodiments of this application are described below.
   (1) PON: a communication network architecture in which a fiber-optic transmission technology is used. The PON transmits an optical signal to a user by using an optical fiber as a transmission medium, to implement high-speed data transmission and broadband access.
   (2) OLT: a core device of the PON network. The OLT is responsible for sending and receiving an optical signal, and converting data into an optical signal and transmitting the optical signal to a user side through an optical fiber.
   (3) ODN: namely, an optical distribution network. The ODN is responsible for transmitting an optical signal from the OLT to a user terminal, and usually has a tree or star topology and transmits a signal to different users through optical fiber branches.
   (4) ONU: a user-side device usually mounted at a user home, an office, a campus, or other places. The ONU is mainly responsible for receiving an optical signal and converting the optical signal into an electrical signal, and providing a network connection for user equipment, for example, a computer, a telephone, or a router.
   (5) Ethernet: a common communication protocol and a network technology based on packet switching. Usually, the Ethernet is widely used in a local area network (LAN) to implement transmission/exchange of related data.
   (6) Multi-point control protocol (MPCP): a media access control (MAC) sublayer protocol in an Ethernet passive optical network (EPON).

It should be noted that the MPCP further defines a control mechanism between the OLT and the ONU, to coordinate efficient sending and receiving of data/messages.
   (7) EPON: an Ethernet-based PON technology. The EPON uses a point-to-multipoint structure and passive fiber-optic transmission, and may provide a variety of services on the Ethernet.
   (8) BOSA: a component used in the optical communication field. The BOSA usually includes elements, such as a laser, a photodetector, a photoelectric converter, and the like, and is configured to convert an optical signal into an electrical signal or convert an electrical signal into an optical signal. The BOSA performs an important function in a fiber-optic communication system, and is used in manufacturing and integration of an optical module, an optical transceiver, and an optical network device. In addition, the BOSA is one of core components of the optical module, and common applications include functions, such as optical signal modulation/demodulation and the like, in a fiber-optic transceiver (Trx), an optical network interface card (NIC), and an optical network device, which are capable of implementing transmission and reception of high-speed optical signals to support high-speed transmission and long-distance transmission of the fiber-optic communication system.

Further, the following briefly describes a design concept of the embodiments of this application based on the foregoing terms and related descriptions.

An optical signal used in the PON needs to pass through an optical splitter, and the optical splitter may cause large optical attenuation. Usually, a 1:16 (1-to-16) splitter may cause attenuation of 14.1 decibels (dB), and a 1:32 splitter may cause attenuation of 17.4 dB.

Therefore, in the PON, to adapt to an optical path attenuation loss greater than that in a general-purpose Ethernet, light-emitting power of a PON optical module (including an optical module of an OLT device and an optical module of an ODN device) may be enhanced to offset an additional optical path loss caused by the optical splitter, which prevents light intensity of the optical signals arriving at two ends from being lower than reception sensitivity of the PON optical module due to the excessively large attenuation, and therefore avoids an error.

However, because the light-emitting power of the PON optical module is additionally enhanced (to be specific, the PON optical module can emit a strong optical signal), PON devices (the OLT device and the ONU device) are not allowed to be directly connected (short-circuited) without an optical splitter. A reason is as follows: If no splitter is used, high-power light intensity of a transmit end is directly received by a peer end without sufficient attenuation. In this case, the light intensity exceeds reception sensitivity of the PON optical module, causing an error.

For example, as shown in FIG. 1, an ONU device usually needs to be interconnected with an OLT device through an optical splitter. The ONU device is a user-side device, and a large quantity of ONU devices may be deployed in a PON system. Therefore, to reduce costs of the ONU devices, usually, an optical module that is in an ONU device and that is connected to an OLT device may be fastened to the ONU device through a BOSA, to replace a small form pluggable (SFP)-packaged optical module. In this way, only a lead of an optical fiber needs to be inserted into the BOSA during use.

In addition, uplink traffic of the ONU device uses uplink bandwidth resources at different time based on a time division multiplexing mechanism. Therefore, the ONU device needs to use bandwidth resources based on a time schedule delivered by the OLT device, to complete data transmission.

It can be learned that, in the foregoing PON system, the ONU device can serve only as an optical network device connected through a branching fiber, to be specific, the ONU device has a mono operating mode. Therefore, if a user does not have a PON requirement (for example, uplink bandwidth of the ONU device is insufficient), the ONU device is useless, leading to a waste of investment. For example, a conventional ONU device cannot serve as a general-purpose switching network device for point-to-point and full-bandwidth use with an OLT device or a switch device.

Specifically, an ONU device in a conventional PON can operate only in a point-to-multipoint connection mode and is connected to an OLT device through an optical splitter. Uplink traffic of the ONU device shares uplink bandwidth resources with other ONU devices through the time division multiplexing mechanism. It can be learned that, if an ONU device needs to be individually interconnected with the OLT device, the ONU device also needs to be connected to the OLT device through an optical splitter by using the foregoing architecture, and time of occupying uplink bandwidth by the ONU device needs to be set to a maximum value on the OLT device. However, because the MPCP includes some unnecessary resource overheads, a part of bandwidth may be wasted.

Further, if the ONU device needs to be directly interconnected with the OLT device, an accessory related to optical signal attenuation, for example, an optical splitter or an optical attenuator, needs to be additionally added. If the optical splitter is used, a large size of the optical splitter leads to difficulty in deployment, and existence of a plurality of splitter interfaces is quite likely to cause a risk of signal leakage. If the optical attenuator is used, an optical attenuator with suitable specifications needs to be selected. The selection is troublesome, and strong professionalism is required.

If a user does not have a PON requirement (for example, uplink bandwidth of the ONU device is insufficient), the ONU device is useless, leading to a waste of investment.

A hardware architecture of the ONU device may be transformed into a switch for use. However, an optical module in the ONU device is usually fastened through a BOSA, and the optical module cannot be replaced. Therefore, when light emitting is excessively strong, the optical module cannot or is difficult to be interconnected with a general-purpose switch. In addition, optical ports of the ONU device are usually in a PON mode by default, and consequently, the ONU device cannot serve as an Ethernet switch. It can be easily learned that conventional user equipment (for example, the ONU device) has a mono operating mode and poor use flexibility.

The embodiments of this application provide a method for switching an operating mode of user equipment. The method specifically includes: obtaining a user equipment interconnection request sent by a network device, parsing the user equipment interconnection request to obtain an expected operating mode message carrying an expected operating mode of the user equipment, and then, if a message type corresponding to the expected operating mode message is different from a message type used when the user equipment is in a default operating mode, switching the user equipment from the default operating mode to the expected operating mode based on the expected operating mode message, where the default operating mode is used to indicate that the user equipment uses uplink bandwidth in a time division multiplexing mode in a PON. This achieves diversity of operating modes of the user equipment based on the expected operating mode message carrying the expected operating mode.

Particularly, the following describes preferred embodiments of this application with reference to the accompanying drawings in this specification. It should be understood that the preferred embodiments described herein are merely intended to describe this application, but not to limit this application. In addition, in the case of no conflict, the embodiments of this application and the features in the embodiments may be combined with each other.

Figure 2:
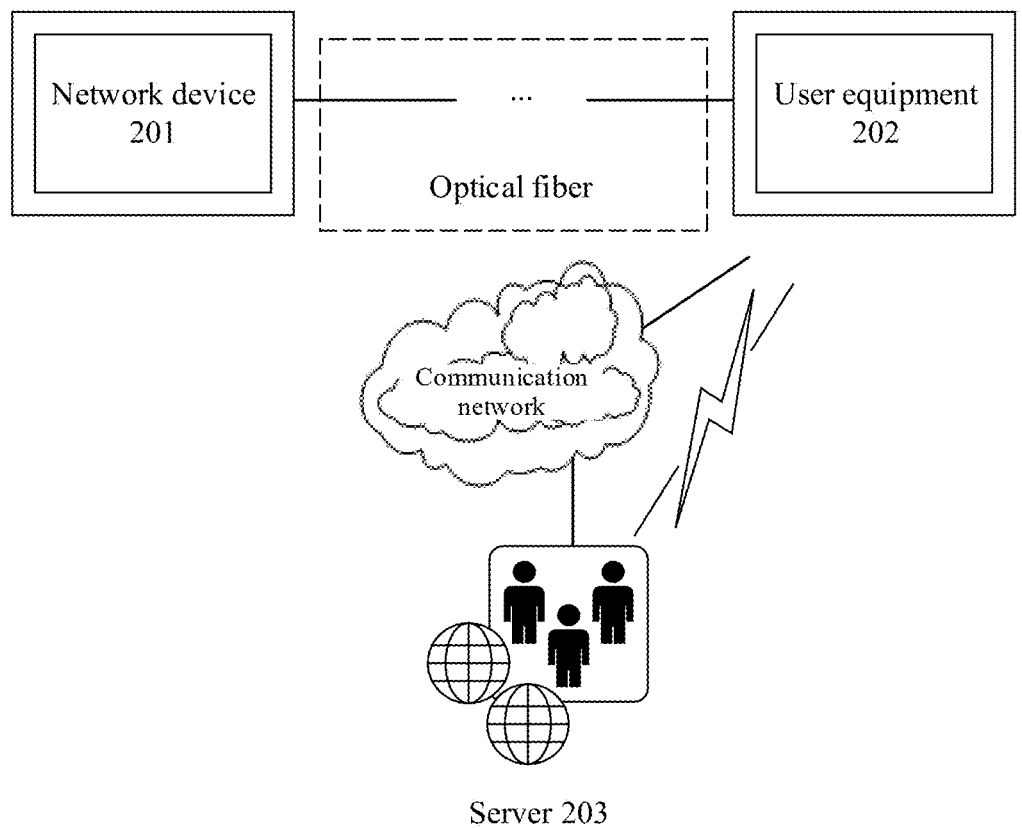
FIG. 2 is a schematic diagram of an optional system architecture according to an embodiment of this application.

FIG. 2 is a schematic diagram of an optional system architecture to which the embodiments of this application are applicable. The system architecture includes a network device 201, user equipment 202, and a server 203. The network device 201 is connected to the user equipment 202 through an optical fiber. The server 203 is a server of the user equipment, and may exchange information with the user equipment 202 through a communication network. A communication mode used by the communication network may include a wireless communication mode and a wired communication mode.

Figure 3:
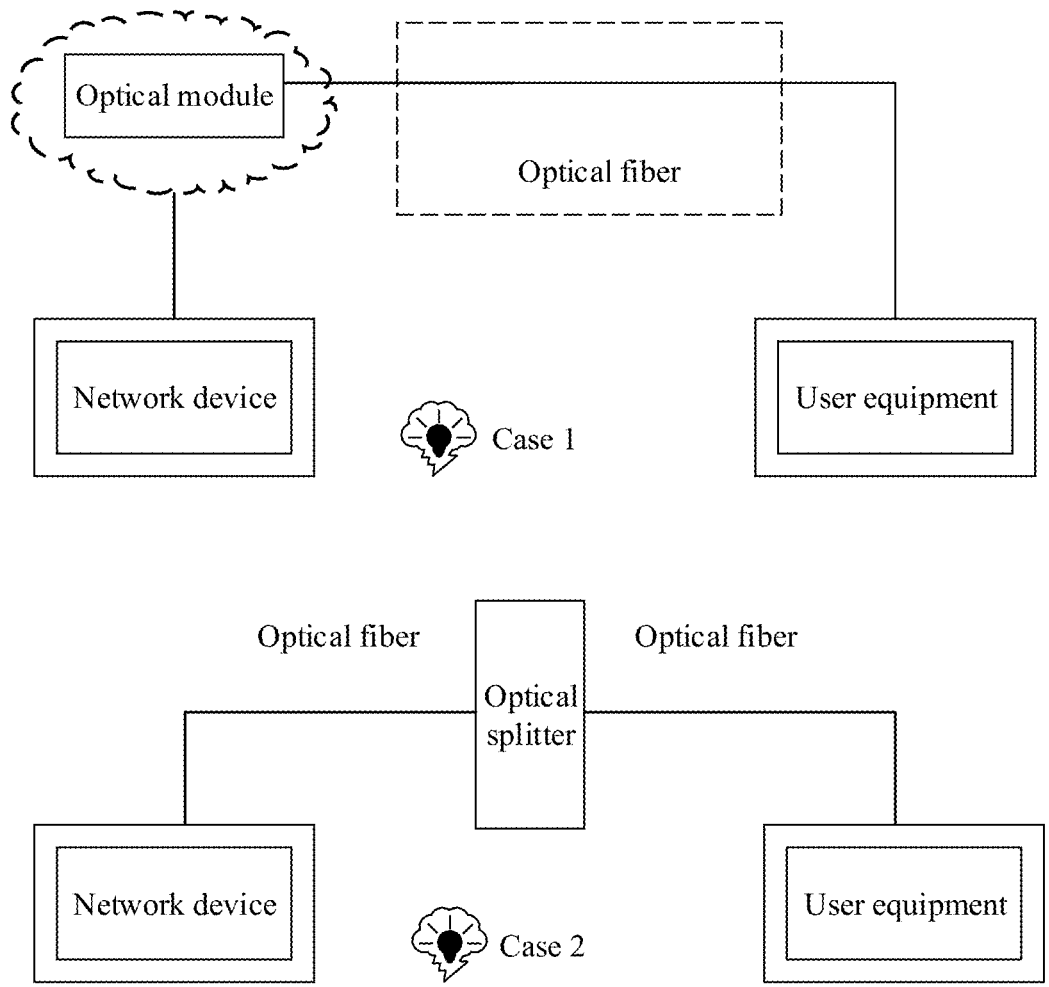
FIG. 3 is a schematic diagram of a connection between a network device and user equipment according to an embodiment of this application.

For example, as shown in FIG. 3, the network device 201 may be interconnected with the user equipment 202 through an optical fiber and a customized optical module of the network device 201, or may be interconnected with the user equipment 202 through an optical fiber and an optical attenuation device (for example, an optical splitter or an optical attenuator).

Compared with a common optical module, the customized optical module can receive an optical signals transmitted by a PON optical module on the user equipment 202, in other words, can receive a strong optical signal.

In this embodiment of this application, the network device 201 and the user equipment 202 may exchange information through an ODN.

For another example, the user equipment 202 may access a network through a cellular mobile communication technology to communicate with the server 203. The cellular mobile communication technology includes, for example, a fifth-generation mobile communication (5G) technology.

Optionally, the user equipment 202 may access a network in a short-range wireless communication mode to communicate with the server 203. The short-range wireless communication mode includes, for example, a wireless fidelity (Wi-Fi) technology.

A quantity of communication devices in the foregoing system architecture is not limited in the embodiments of this application. For example, there may be more servers 203 or no server 203, or other network devices may be further included. As shown in FIG. 2, the network device 201, the user equipment 202, and the server 203 are merely used as an example for description. The following briefly describes the foregoing devices and their respective functions.

The network device 201 is configured to receive an optical signal sent by the user equipment through the PON optical module, perform optical-to-electrical conversion on the received optical signal, and send a user equipment interconnection request to the user equipment 202, so that the network device 201 can be interconnected with the user equipment 202, to exchange related information, for example, transmit the optical signal, between the network device 201 and the user equipment 202; is configured to send an MPCP message to the user equipment 202, so that an operating mode of the user equipment 202 is a default operating mode; and may be further configured to receive an access registration request sent by the user equipment 202, and return an access registration response based on the access registration request.

It should be noted that the PON optical module is an optical module commonly used by the user equipment in a PON, that is, a common optical module on the user equipment.

The default operating mode is an operating mode of conventional user equipment. To be specific, the user equipment 202 can operate only in a point-to-multipoint connection mode, and is connected to the network device 201 through an optical splitter, and uplink traffic shares uplink bandwidth resources with other user equipment 202 based on a time division multiplexing mechanism. Therefore, the default operating mode may be referred to as a PON operating mode. In other words, the user equipment 202 is in a PON mode.

Optionally, because a conventional ONU device usually serves only as an optical network device connected through a branching fiber, the default operating mode may alternatively be a time division multiplexing mode or a splitter mode. It should be noted that the foregoing naming of the operating modes of the user equipment is merely an example for description.

For example, the access registration response may indicate that the user equipment 202 is registered with and accesses the network device 201. To be specific, the user equipment 202 is successfully registered with the network device 201, and information can be exchanged between the user equipment 202 and the network device 201. Similarly, the access registration response may alternatively indicate that the user equipment 202 is not successfully registered with the network device 201. To be specific, registration of the user equipment 202 with the network device 201 fails, and information cannot be exchanged between the user equipment 202 and the network device 201.

Optionally, in this embodiment of this application, the network device 201 includes but is not limited to an OLT device and a general-purpose switch. The OLT device supports the MPCP, and the general-purpose switch usually does not support the MPCP.

The foregoing functions of the network device 201 are only some of functions of the network device 201 in this embodiment of this application, and not all of the functions of the network device 201 are exhaustively described as examples. To be specific, the network device 201 further has other functions. Other specific functions of the network device 201 are not specifically limited in this embodiment of this application.

In this embodiment of this application, if the customized optical module is mounted in the network device 201, the network device 201 may be configured to: when an optical signal sent by the user equipment in an expected operating mode through the PON optical module is received directly through an optical fiber, perform, through the optical module of the network device, power processing on the received optical signal based on reception sensitivity of the optical module and then perform optical-to-electrical conversion; and send a user equipment interconnection request to the user equipment through the optical module. It can be learned that the optical module of the network device 201 may be configured to: when the optical signal sent by the user equipment 202 through the PON optical module is received directly through the optical fiber, perform power processing on the received optical signal based on the reception sensitivity of the optical module and then perform optical-to-electrical conversion; and send the user equipment interconnection request to the user equipment 202. It can be understood by a person skilled in the art that the direct reception through the optical fiber indicates that no component with an attenuation function, for example, an optical splitter or an attenuator, is used between the network device 201 and the user equipment 202 to attenuate an optical signal. It can be further understood by a person skilled in the art that the network device 201 and the user equipment 202 may alternatively be cascaded through another network device and an optical fiber.

The user equipment 202 is configured to be connected to the optical module of the network device 201 through an optical fiber, or connected to the network device 201 through an optical fiber and an optical attenuation device (as shown in FIG. 3); and is configured to transmit and process an optical signal between the user equipment 202 and the network device 201.

Particularly, in this embodiment of this application, the user equipment 202 may alternatively automatically switch its own operating mode by automatically recognizing an expected operating mode message carried in the user equipment interconnection request from the network device 201. To be specific, the user equipment 202 no longer has only a mono operating mode (serving only as an optical network device connected through a branching fiber).

It should be further noted that, as shown in FIG. 3, an optical module is customized based on a conventional optical module, to be specific, an apparatus is added at an optical module receive end (namely, the network device 201), to receive a high-power optical signal sent by the PON optical module of the user equipment 202 and make the optical signal fall within a range of reception sensitivity. Transmit power is kept at transmit power of a general-purpose optical module, so that the optical signal does not fall beyond reception sensitivity of a BOSA at a user receive end (namely, the user equipment 202) in the case of direct connection through an optical fiber without using an optical splitter or an optical attenuator.

Therefore, when the optical module in FIG. 3 is used, the network device 201 and the user equipment 202 can be directly connected through an optical fiber in a point-to-point mode without using an optical splitter or an optical attenuator.

The server 203 may be an independent physical server, or may be a server cluster or a distributed system that includes a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform.

In this embodiment of this application, the server 203 is configured to: obtain a user equipment interconnection request sent by the network device 201; parse the user equipment interconnection request to obtain an expected operating mode message carrying an expected operating mode of the user equipment 202; and then, if a message type corresponding to the expected operating mode message is different from a message type used when the user equipment 202 is in a default operating mode, switch the user equipment 202 from the default operating mode to the expected operating mode based on the expected operating mode message.

Optionally, if the expected operating mode is different from the default operating mode, the expected operating mode may be an Ethernet operating mode, in other words, the user equipment 202 is in an Ethernet mode. In addition, because the user equipment can use uplink bandwidth resources at full bandwidth in the Ethernet operating mode, the Ethernet operating mode may also be referred to as an all-optical mode. It should be further noted that all or some of functions of the server 203 may alternatively be implemented on the user equipment 202.

A method for switching an operating mode of user equipment provided in exemplary implementations of this application is described below with reference to the foregoing system architecture and the accompanying drawings. It should be noted that the foregoing system architecture is shown only for ease of understanding the spirit and the principle of this application, and the implementations of this application are not limited thereto.

Figure 4:
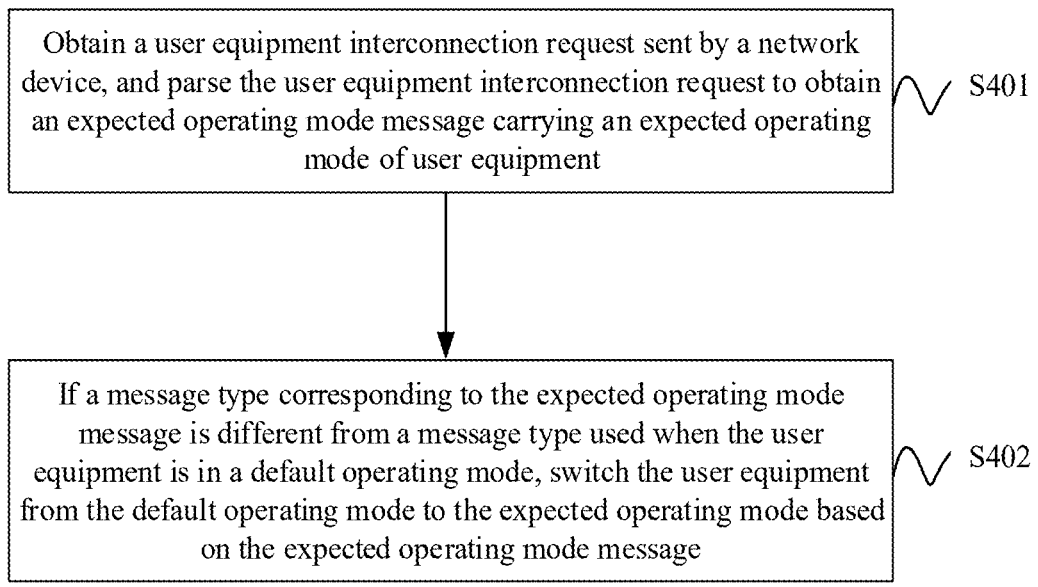
FIG. 4 is a schematic diagram of an implementation process of a method for switching an operating mode of user equipment according to an embodiment of this application.

FIG. 4 is a schematic diagram of an implementation process of a method for switching an operating mode of user equipment according to an embodiment of this application. For example, an execution entity is a server (for example, user equipment on a user side). A specific implementation process of the method is described as follows.

S401: Obtain a user equipment interconnection request sent by a network device, and parse the user equipment interconnection request to obtain an expected operating mode message carrying an expected operating mode of user equipment.

The user equipment interconnection request is used to transmit the expected operating mode message carrying the expected operating mode of the user equipment to the user equipment, so that the user equipment adjusts its own operating mode based on the expected operating mode, and is interconnected with the network device after the user equipment adjusts its own operating mode to the expected operating mode. Optionally, the network device may be an OLT device or a (general-purpose) switch.

For example, the user equipment interconnection request may be based on a PON-related network protocol, for example, the MPCP, or an Ethernet-based network protocol.

S402: If a message type corresponding to the expected operating mode message is different from a message type used when the user equipment is in a default operating mode, switch the user equipment from the default operating mode to the expected operating mode based on the expected operating mode message.

The default operating mode is used to indicate that the user equipment uses uplink bandwidth in a time division multiplexing mode in a PON. Optionally, if an optical port of the user equipment is in a PON mode and a PON optical module of the user equipment is in a non-light-emitting state, it can be determined that the user equipment is in the default operating mode. In this way, the server can accurately and quickly determine whether the user equipment is in the default operating mode.

Particularly, that the optical port of the user equipment is in the PON mode indicates an operating state of the optical port in a case in which the user equipment is in the PON mode.

For example, that the optical port of the user equipment is in the PON mode includes: The optical port of the user equipment is not capable of sending an optical signal, the optical port of the user equipment is capable of receiving an optical signal, and the optical port of the user equipment is capable of receiving a message. In addition, if the PON optical module of the user equipment is turned off (to be specific, a light-emitting switch of the PON optical module is in an off state), it can be determined that the PON optical module of the user equipment is in the non-light-emitting state.

Optionally, when the user equipment is in the default operating mode, a MAC forwarding function of the user equipment is in an off state, to be specific, a MAC forwarding switch is turned off, or the user equipment does not have a MAC forwarding capability.

In an optional implementation, the server may determine whether the message type corresponding to the expected operating mode message is the same as the message type used when the user equipment is in the default operating mode by determining whether a message protocol type corresponding to the expected operating mode message is the same as a message protocol type used when the user equipment is in the default operating mode. To be specific, if the message protocol type corresponding to the expected operating mode message is different from the message protocol type used when the user equipment is in the default operating mode, it is determined that the message type corresponding to the expected operating mode message is different from the message type used when the user equipment is in the default operating mode; or on the contrary, the message type corresponding to the expected operating mode message is the same as the message type used when the user equipment is in the default operating mode.

In the foregoing embodiment, different message protocol types are used in different operating modes, so that whether the message type corresponding to the expected operating mode message is different from the message type used when the user equipment is in the default operating mode can be quickly determined, to improve efficiency of subsequent operating mode switching.

Optionally, the message protocol type corresponding to the expected operating mode message is a non-MPCP type, and the message protocol type used when the user equipment is in the default operating mode is an MPCP type.

For example, assuming that the message protocol type corresponding to the expected operating mode message is the MPCP type, it can be determined that the message protocol type corresponding to the expected operating mode message is the same as the message protocol type used when the user equipment is in the default operating mode; or assuming that the message protocol type corresponding to the expected operating mode message is a non-MPCP type (for example, a message protocol type of an Ethernet-related protocol), it can be determined that the message protocol type corresponding to the expected operating mode message is different from the message protocol type used when the user equipment is in the default operating mode.

It should be noted that a message type corresponding to an operating mode message is related to a scenario of interconnection between the user equipment and the network device. In addition, the MPCP is usually a point-to-multipoint interconnection scenario, and the MPCP is used in a scenario of point-to-multipoint interconnection between a conventional OLT device and user equipment. Therefore, if the message protocol type corresponding to the foregoing operating mode message is not the MPCP type, it can be quickly determined that the message type corresponding to the expected operating mode message is different from the message type used when the user equipment is in the default operating mode, so that whether an operating mode of the user equipment needs to be switched can be quickly determined subsequently.

Optionally, the server may alternatively determine whether the message type corresponding to the expected operating mode message is the same as the message type used when the user equipment is in the default operating mode by detecting a type of a current interconnection scenario. To be specific, if it is detected that the type of the current interconnection scenario is point-to-multipoint, it can be determined that the message type corresponding to the expected operating mode message is the same as the message type used when the user equipment is in the default operating mode; or on the contrary, if it is detected that the type of the current interconnection scenario is point-to-point, it can be determined that the message type corresponding to the expected operating mode message is different from the message type used when the user equipment is in the default operating mode.

Further, after determining that the message type corresponding to the expected operating mode message is different from the message type used when the user equipment is in the default operating mode, the server may switch the user equipment from the default operating mode to the expected operating mode based on the obtained expected operating mode message.

In an optional implementation, the server usually needs to perform the following operations when switching the user equipment from the default operating mode to the expected operating mode:

1. Switch the optical port of the user equipment from the PON mode to an Ethernet mode.

That the optical port of the user equipment is in the Ethernet mode indicates an operating state of the optical port in a case in which the user equipment is in the Ethernet mode. For example, the switching the optical port of the user equipment from the PON mode to an Ethernet mode includes but is not limited to: enabling an auto-negotiation capability of the optical port of the user equipment.

2. Enable a MAC forwarding capability of the user equipment.

Specifically, the server turns on the MAC forwarding switch to enable the MAC forwarding capability of the user equipment, so that the MAC forwarding capability of the user equipment is in an on state, in other words, the MAC forwarding switch is turned on, or the user equipment has a MAC forwarding capability.

3. Indicate the PON optical module of the user equipment to be in a light-emitting state.

Specifically, assuming that the PON optical module of the user equipment is currently in a state of using uplink bandwidth, in other words, the PON optical module of the user equipment is in the light-emitting state, the server indicates the PON optical module of the user equipment to be in the light-emitting state. In addition, assuming that the PON optical module of the user equipment is currently not using uplink bandwidth, in other words, the PON optical module of the user equipment is in the non-light-emitting state, the server may turn on the light-emitting switch of the PON optical module of the user equipment to adjust the PON optical module of the user equipment from the non-light-emitting state to the light-emitting state.

Clearly, in the foregoing mode switching manner, when it is determined that the message type corresponding to the expected operating mode message is different from the message type used when the user equipment is in the default operating mode, the user equipment may be switched from the default operating mode to the expected operating mode, so that operating mode diversity of the user equipment is improved. In addition, full-bandwidth use of uplink bandwidth resources by the user equipment is implemented by switching the user equipment from the default operating mode to the expected operating mode.

Figure 5:
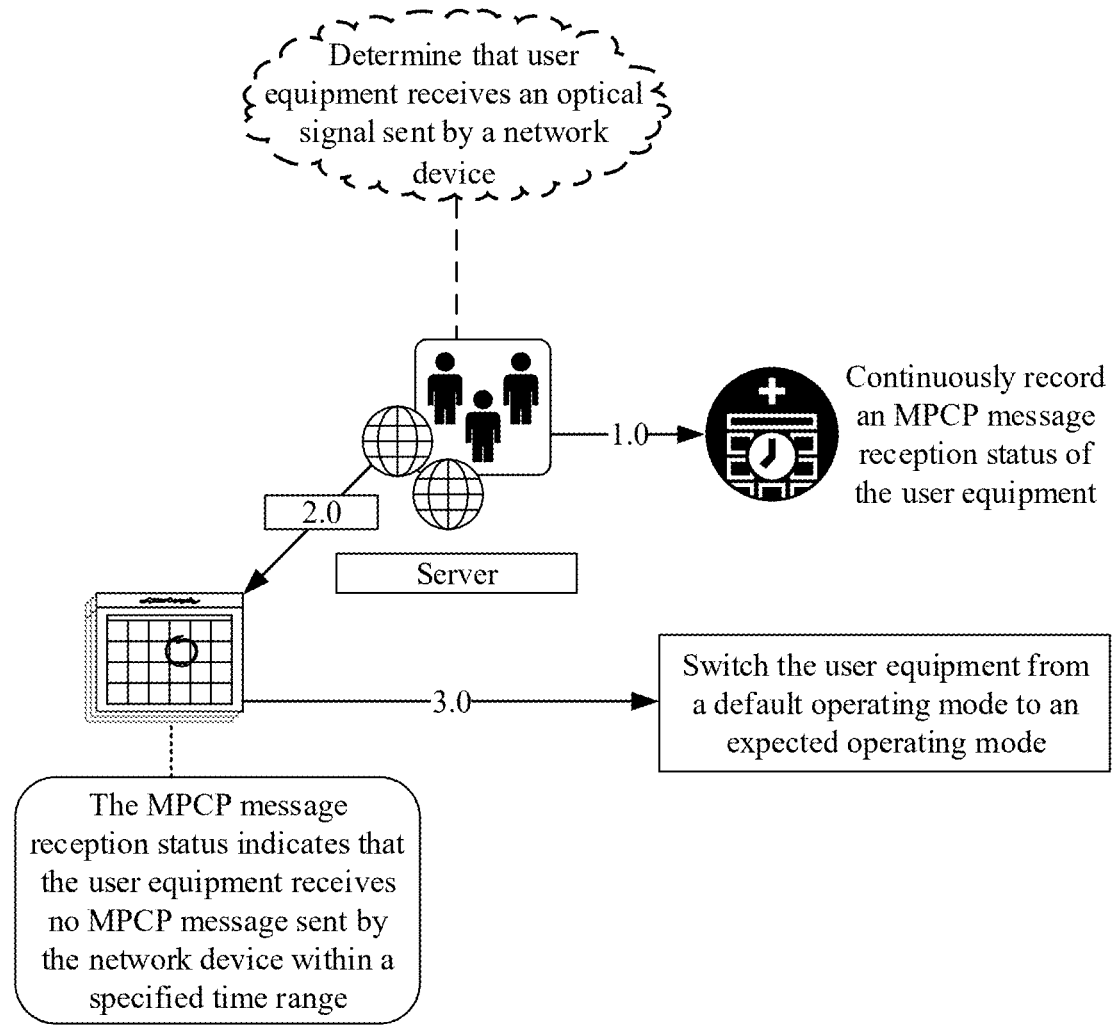
FIG. 5 is a schematic logic diagram of switching user equipment from a default operating mode to an expected operating mode according to an embodiment of this application.

In an optional implementation, as shown in FIG. 5, the server continually records an MPCP message reception status of the user equipment when determining that the user equipment receives an optical signal sent by the network device, and switches the user equipment from the default operating mode to the expected operating mode if the MPCP message reception status indicates that the user equipment receives no MPCP message sent by the network device within a specified time range. In this way, even if the user equipment receives no expected operating mode message, the user equipment can be automatically switched from the default operating mode to the expected operating mode when it is determined that the user equipment is capable of receiving an optical signal sent by the network device and MPCP message reception times out.

Further, the user equipment can support reception of a message (for example, an MPCP message) in any operating mode. However, when the user equipment is in the expected operating mode, although the user equipment can receive an MPCP message and can also send an MPCP message to a central processing unit (CPU), the user equipment does not respond to an MPCP message, and only detects existence of an MPCP message. Therefore, after switching the user equipment from the default operating mode to the expected operating mode, the server may further switch the user equipment from the expected operating mode to the default operating mode in response to an operating mode initialization operation of the user equipment or when determining that the user equipment detects that the network device sends an MPCP message. In this way, the user equipment can freely switch between two operating modes: the expected operating mode and the default operating mode.

For example, the operating mode initialization operation may be a plug operation on an optical fiber at the optical port of the user equipment. After switching the user equipment from the default operating mode to the expected operating mode, the server may indicate the user equipment to actively detect whether the network device is sending an MPCP message. If detecting that the network device is sending an MPCP message, the user equipment may feed back related information to the server, so that the server switches the user equipment from the expected operating mode to the default operating mode based on the related information that is fed back.

Figure 6:
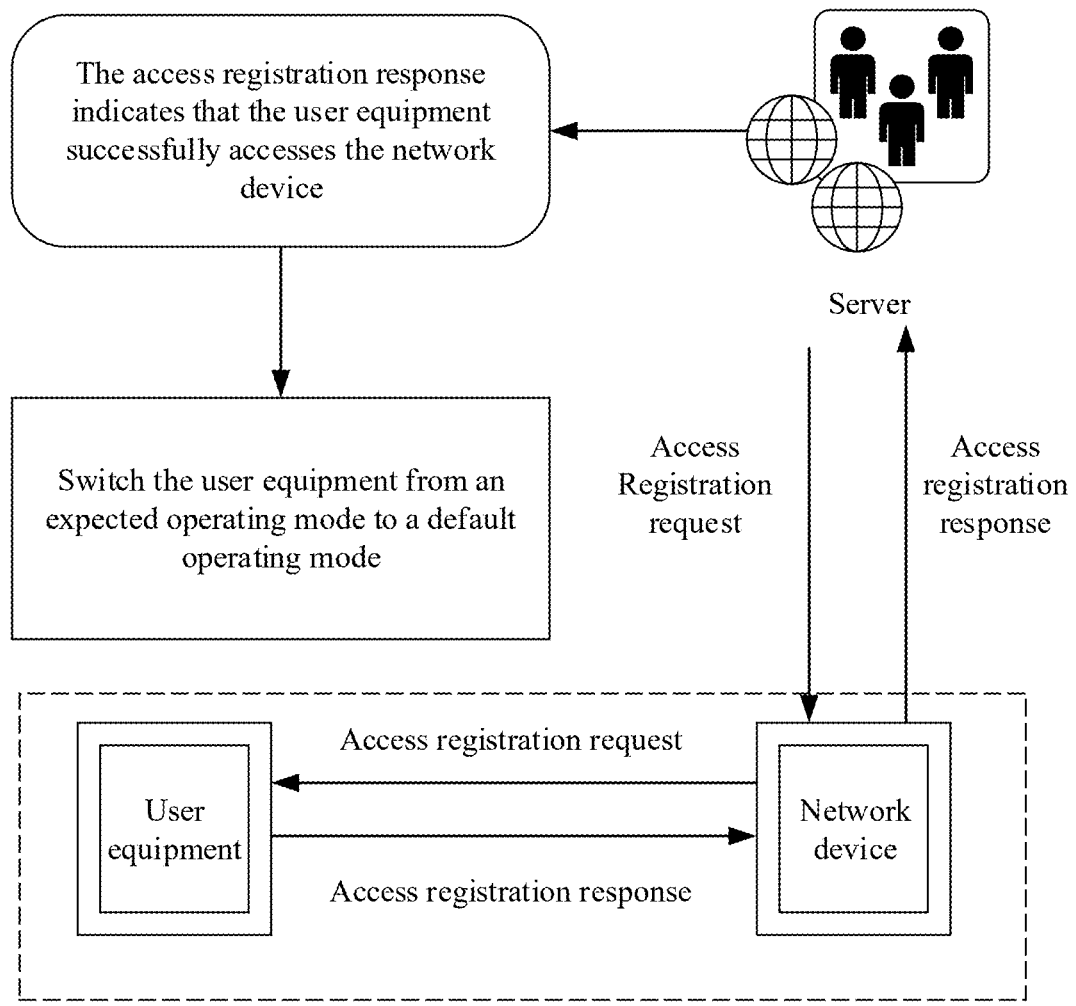
FIG. 6 is a schematic logic diagram of switching user equipment from a default operating mode to an expected operating mode according to an embodiment of this application.

Therefore, as shown in FIG. 6, the server sends an access registration request to the network device, receives an access registration response returned by the network device based on the access registration request, and switches the user equipment from the expected operating mode to the default operating mode if the access registration response indicates that the user equipment is successfully registered with the network device. In this manner, the user equipment is switched from the expected operating mode back to the default operating mode based on the access registration request and the access registration response indicating that the user equipment is successfully registered with the network device, and flexibility of operating mode switching of the user equipment is improved.

It should be noted that the access registration request may be sent by the user equipment to the network device, to be specific, the server indicates the user equipment to send the access registration request to the network device, or the user equipment may actively send the access registration request to the network device; and the access registration response is transmitted to the server through the user equipment.

In addition, still as shown in FIG. 3, the network device may be directly connected to the user equipment through an optical fiber and a customized optical module of the network device to ensure that the user equipment is in the expected operating mode, or the network device may be connected to the user equipment through an optical fiber and an optical splitter to ensure that the user equipment is in the default operating mode. Therefore, it can be easily learned that, if the user equipment is in the default operating mode, an optical signal transmitted by the PON optical module of the user equipment is attenuated and then sent to the network device; or if the user equipment is in the expected operating mode, an optical signal transmitted by the PON optical module of the user equipment is sent to the network device directly through the optical fiber.

In this way, optical signal transmission modes (to be specific, an optical signal transmission mode 1 includes the optical module of the network device and an optical fiber, and an optical signal transmission mode 2 includes an optical fiber and an optical splitter) are respectively set for different operating modes of the user equipment, to ensure operating mode diversity and use flexibility of the user equipment to some extent.

Figure 7:
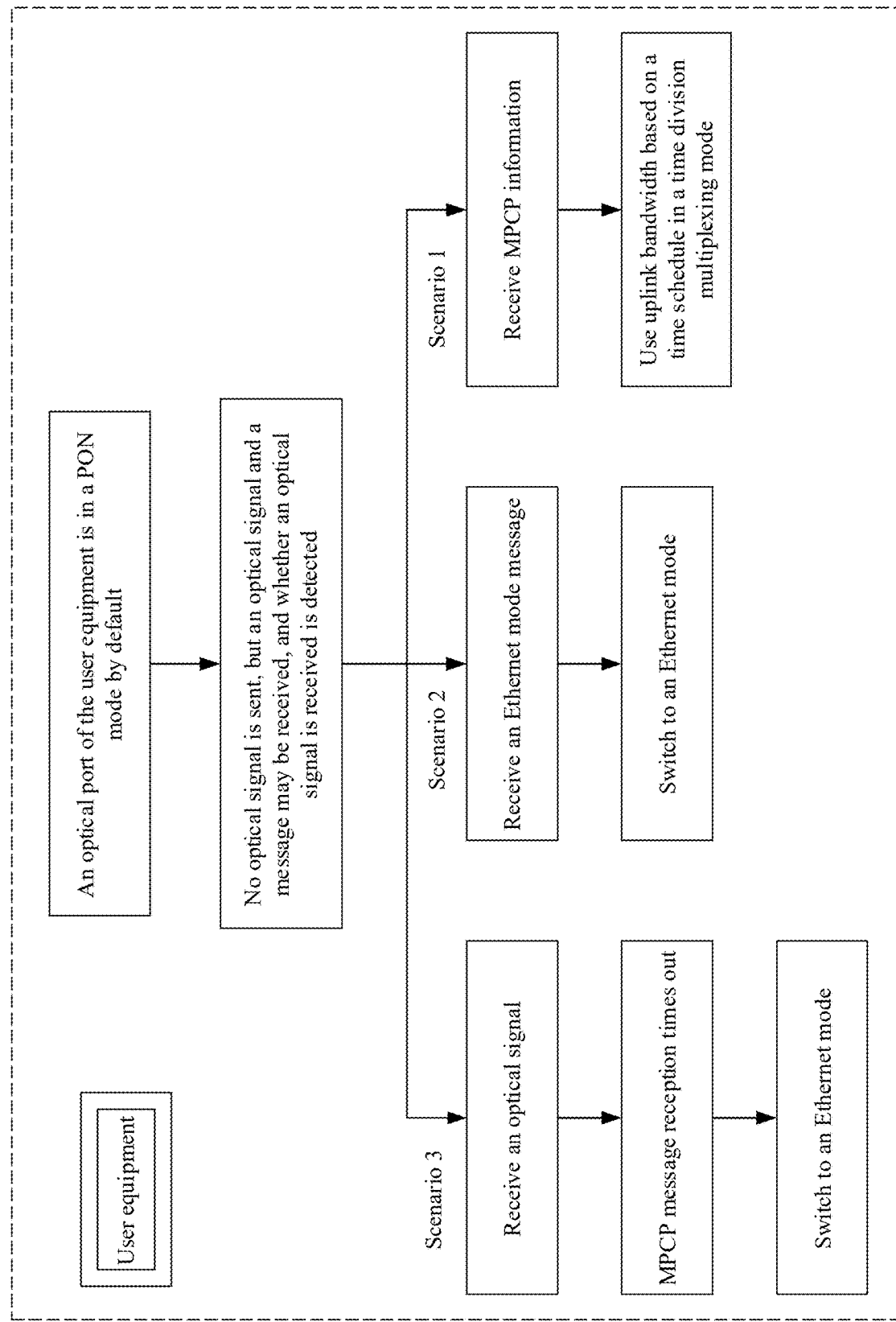
FIG. 7 is a schematic diagram of an example scenario of automatically recognizing and switching an operating mode by user equipment according to an embodiment of this application.

Based on the method for switching an operating mode of user equipment described in steps S401 and S402, as shown in FIG. 7, the user equipment may implement operating mode recognition and switching in the following three scenarios.

It should be noted that, in an initial state, an operating mode of the user equipment is the default operating mode (namely, a PON operating mode). This specifically includes: The optical port (namely, a PON port) of the user equipment is in the PON (optical port/port) mode by default. To be specific, the optical port of the user equipment is in a state of being unable to send an optical signal but able to receive an optical signal and a message, and may further detect whether an optical signal is received.

For example, it may be detected based on a specified optical signal detection periodicity whether there is an optical signal at the optical port of the user equipment, in other words, whether the user equipment receives an optical signal.

A. Scenario 1 (general-purpose PON use scenario):

This is a default operating mode of conventional user equipment.

Therefore, in this scenario, after receiving an MPCP message from the network device (for example, an OLT device), the user equipment may initiate registration with the network device, to be specific, send an access registration request to the network device.

After the registration is completed, the user equipment may use uplink bandwidth (resources) in a time division multiplexing mode based on a time schedule delivered by the OLT device, so that the user equipment is in the default operating mode.

B. Scenario 2 (the message type corresponding to the expected operating mode message is a non-MPCP type):

In this scenario, the OLT device delivers information (namely, the expected operating mode message, which may also be referred to as an Ethernet mode message) to the user equipment, to indicate that an operating mode of the user equipment is an Ethernet operating mode.

Then the operating mode of the user equipment may be switched from the PON operating mode (namely, the default operating mode) to the Ethernet operating mode (namely, the expected operating mode). This specifically includes: switching the optical port of the user equipment to the Ethernet mode (for example, enabling the auto-negotiation function/capability of the optical port), enabling light emitting of an optical module (to be specific, adjusting the PON optical module of the user equipment from the non-light-emitting state to the light-emitting state), and enabling a MAC forwarding function (to be specific, enabling the MAC forwarding capability of the user equipment).

C. Scenario 3 (an optical signal is received, and MPCP message reception times out):

In this scenario, when it is detected that the optical port of the user equipment receives an optical signal and no MPCP message is received within a specified time range (in other words, MPCP message reception times out), the operating mode of the user equipment may be switched from the PON operating mode to the Ethernet operating mode. This specifically includes: automatically switching the optical port of the user equipment to the Ethernet mode (for example, enabling the auto-negotiation function/capability of the optical port), enabling light emitting of an optical module (to be specific, adjusting the PON optical module of the user equipment from the non-light-emitting state to the light-emitting state), and enabling a MAC forwarding function (to be specific, enabling the MAC forwarding capability of the user equipment).

It should be noted that the foregoing MPCP message may be an MPCP registration message, to be specific, the access registration response indicating that the user equipment is successfully registered with the network device.

Clearly, in the foregoing method steps, based on use scenarios (for example, point-to-multipoint interconnection and point-to-point interconnection), the user equipment not only can serve as conventional user equipment to perform point-to-multipoint interconnection with the network device, but also can serve as an Ethernet device to perform point-to-point interconnection with the network device. In addition, the optical module of the network device can implement a direct connection between the user equipment and the network device through an optical fiber without using an optical attenuator or an optical splitter. In this way, the operating mode of the user equipment can be automatically recognized and switched.

Further, assuming that an execution entity is a network device on a central office side, a corresponding signal processing method for a network device may be implemented. The method specifically includes: when an optical signal sent by user equipment in an expected operating mode through a PON optical module is received directly through an optical fiber, performing, by an optical module of the network device, power processing on the received optical signal based on reception sensitivity of the optical module and then performing optical-to-electrical conversion; and sending a user equipment interconnection request to the user equipment through the optical module.

To sum up, in the method for switching an operating mode of user equipment provided in this application, a user equipment interconnection request sent by a network device is obtained, the user equipment interconnection request is parsed to obtain an expected operating mode message carrying an expected operating mode of user equipment, and if a message type corresponding to the expected operating mode message is different from a message type used when the user equipment is in a default operating mode, the user equipment is switched from the default operating mode to the expected operating mode based on the expected operating mode message.

In this manner, the user equipment not only can serve as conventional user equipment to perform point-to-multipoint interconnection with the network device, but also can implement point-to-point interconnection with the network device. This effectively mitigates a problem that conventional user equipment has a mono operating mode and low use flexibility, and therefore improves operating mode diversity and use flexibility of the conventional user equipment. In addition, full-bandwidth use of uplink bandwidth resources by the user equipment is implemented in the expected operating mode in which a message type is different from that in the default operating mode.

Figure 8:
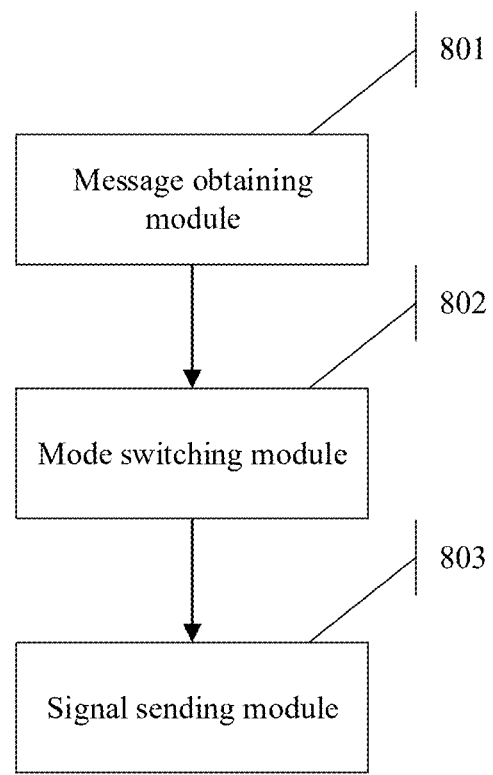
FIG. 8 is a schematic diagram of a structure of an apparatus for switching an operating mode of user equipment according to an embodiment of this application.

Further, based on the same technical concept, an embodiment of this application provides an apparatus for switching an operating mode of user equipment. The apparatus for switching an operating mode of user equipment is used in user equipment on a user side, and is configured to implement the foregoing method process in the embodiments of this application. As shown in FIG. 8, the apparatus for switching an operating mode of user equipment includes a message obtaining module 801, a mode switching module 802, and a signal sending module 803.

The message obtaining module 801 is configured to obtain a user equipment interconnection request sent by a network device, and parse the user equipment interconnection request to obtain an expected operating mode message carrying an expected operating mode of the user equipment.

The mode switching module 802 is configured to: if a message type corresponding to the expected operating mode message is different from a message type used when the user equipment is in a default operating mode, switch the user equipment from the default operating mode to the expected operating mode based on the expected operating mode message, where the default operating mode is used to indicate that the user equipment uses uplink bandwidth in a time division multiplexing mode in a passive optical network PON.

In an optional embodiment, it is determined, in the following manner, that the message type corresponding to the expected operating mode message is different from the message type used when the user equipment is in the default operating mode:
    if a message protocol type corresponding to the expected operating mode message is different from a message protocol type used when the user equipment is in the default operating mode, determining that the message type corresponding to the expected operating mode message is different from the message type used when the user equipment is in the default operating mode.

In an optional embodiment, the message protocol type corresponding to the expected operating mode message is a non-multi-point control protocol MPCP type, and the message protocol type used when the user equipment is in the default operating mode is an MPCP type.

In an optional embodiment, if the following conditions are met, it is determined that the user equipment is in the default operating mode:
    an optical port of the user equipment is in a PON mode; and
    a PON optical module of the user equipment is in a non-light-emitting state.

In an optional embodiment, when switching the user equipment from the default operating mode to the expected operating mode, the mode switching module 802 is specifically configured to:
    switch the optical port of the user equipment from the PON mode to an Ethernet mode;
    enable a media access control MAC address forwarding capability of the user equipment; and
    indicate the PON optical module of the user equipment to be in a light-emitting state.

In an optional embodiment, the mode switching module 802 is further configured to:
    when it is determined that the user equipment receives an optical signal sent by the network device, continually record an MPCP message reception status of the user equipment; and
    if the MPCP message reception status indicates that the user equipment receives no MPCP message sent by the network device within a specified time range, switch the user equipment from the default operating mode to the expected operating mode.

In an optional embodiment, after switching the user equipment from the default operating mode to the expected operating mode, the mode switching module 802 is further configured to:
    switch the user equipment from the expected operating mode to the default operating mode in response to an operating mode initialization operation of the user equipment; or
    when it is determined that the user equipment detects that the network device sends an MPCP message, switch the user equipment from the expected operating mode to the default operating mode.

In an optional embodiment, when switching the user equipment from the expected operating mode to the default operating mode, the mode switching module 802 is specifically configured to:
    send an access registration request to the network device, and receive an access registration response returned by the network device based on the access registration request; and
    if the access registration response indicates that the user equipment is successfully registered with the network device, switch the user equipment from the expected operating mode to the default operating mode.

In an optional embodiment, the apparatus for switching an operating mode of user equipment further includes a signal sending module 803, and the signal sending module 803 is specifically configured to:
    if the user equipment is in the default operating mode, attenuate an optical signal transmitted by the PON optical module of the user equipment and then send the optical signal to the network device; or
    if the user equipment is in the expected operating mode, send, to the network device directly through an optical fiber, an optical signal transmitted by the PON optical module of the user equipment.

Figure 9:
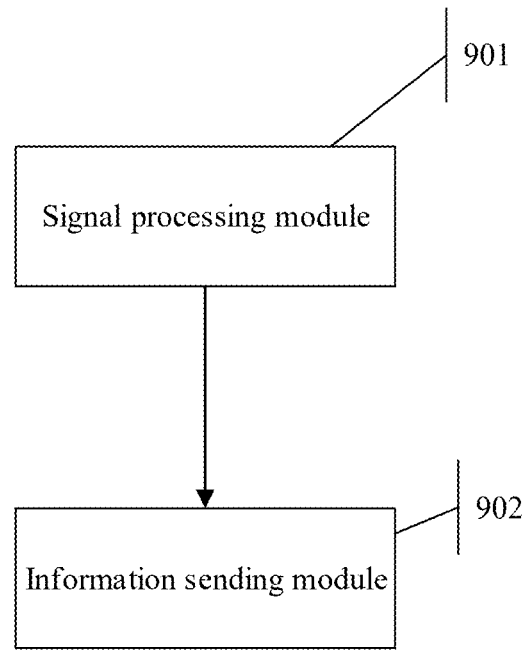
FIG. 9 is a schematic diagram of a structure of a signal processing apparatus for a network device according to an embodiment of this application.

Further, based on the same technical concept, an embodiment of this application provides a signal processing apparatus for a network device. The signal processing apparatus for a network device is used in a network device on a central office side, and is configured to implement the foregoing method process in the embodiments of this application. As shown in FIG. 9, the signal processing apparatus for a network device includes a signal processing module 901.

The signal processing module 901 is configured to: when an optical signal sent by user equipment in an expected operating mode through a PON optical module is received directly through an optical fiber, perform, through an optical module of the network device, power processing on the received optical signal based on reception sensitivity of the optical module and then perform optical-to-electrical conversion, where the expected operating mode is different from a default operating mode of the user equipment, and the default operating mode is used to indicate that the user equipment uses uplink bandwidth in a time division multiplexing mode in a passive optical network PON.

In an optional embodiment, before receiving the optical signal sent by the user equipment in the expected operating mode through the PON optical module, the signal processing apparatus for a network device further includes an information sending module 902, and the information sending module 902 is specifically configured to:

send a user equipment interconnection request to the user equipment through the optical module, where the user equipment interconnection request carries an expected operating mode message for the expected operating mode of the user equipment, and a message type corresponding to the expected operating mode message is different from a message type used when the user equipment is in the default operating mode.

Based on the same inventive concept, an embodiment of this application further provides an optical module. The optical module is mounted in a network device, and the optical module is directly connected to user equipment in an expected operating mode through an optical fiber, including:

The optical module is configured to: when an optical signal sent by the user equipment through a PON optical module is received directly through an optical fiber, perform power processing on the received optical signal based on reception sensitivity of the optical module and then perform optical-to-electrical conversion, where the expected operating mode is different from a default operating mode of the user equipment, and the default operating mode is used to indicate that the user equipment uses uplink bandwidth in a time division multiplexing mode in a passive optical network PON.

In an optional embodiment, the optical module is further configured to:

send a user equipment interconnection request to the user equipment, where the user equipment interconnection request carries an expected operating mode message for the expected operating mode of the user equipment, and a message type corresponding to the expected operating mode message is different from a message type used when the user equipment is in the default operating mode.

Based on the same technical concept, an embodiment of this application further provides an optical module. The optical module is mounted in a network device, and the optical module is directly connected to user equipment in an expected operating mode through an optical fiber, including:

The optical module is configured to: when an optical signal sent by the user equipment through a PON optical module is received directly through an optical fiber, perform power processing on the received optical signal based on reception sensitivity of the optical module and then perform optical-to-electrical conversion, where the expected operating mode is different from a default operating mode of the user equipment, and the default operating mode is used to indicate that the user equipment uses uplink bandwidth in a time division multiplexing mode in a PON.

In an optional embodiment, the optical module is further configured to:

send a user equipment interconnection request to the user equipment, where the user equipment interconnection request carries an expected operating mode message for the expected operating mode of the user equipment, and a message type corresponding to the expected operating mode message is different from a message type used when the user equipment is in the default operating mode.

Figure 10:
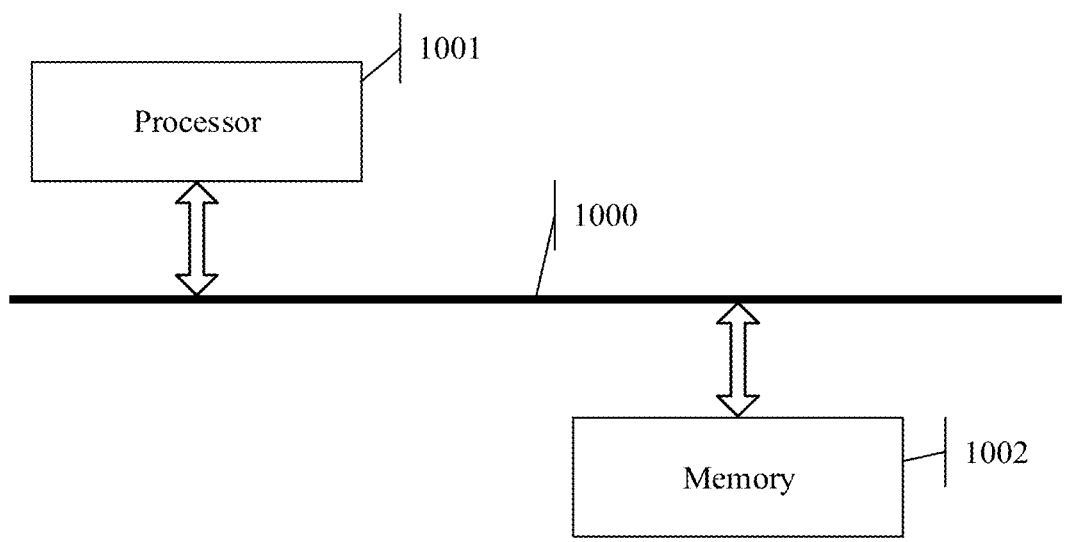
FIG. 10 is a schematic diagram of a structure of an electronic device according to an embodiment of this application.

Based on the same technical concept, an embodiment of this application further provides an electronic device. The electronic device may implement the processes of the method for switching an operating mode of user equipment and the signal processing method for a network device provided in the foregoing embodiments of this application. In an embodiment, the electronic device may be a server, or may be a terminal device or another electronic device. As shown in FIG. 10, the electronic device may include:

at least one processor 1001 and a memory 1002 connected to the at least one processor 1001. A specific connection medium between the processor 1001 and the memory 1002 is not limited in this embodiment of this application. In FIG. 10, for example, the processor 1001 and the memory 1002 are connected through a bus 1000. The bus 1000 is represented by a bold line in FIG. 10. A connection manner between other components is described merely as an example and does not constitute a limitation. The bus 1000 may be classified into an address bus, a data bus, a control bus, and the like. For ease of representation, only one bold line is used to represent the bus in FIG. 10, but this does not mean that there is only one bus or only one type of bus. Alternatively, the processor 1001 may also be referred to as a controller, without a limitation on the name.

In this embodiment of this application, the memory 1002 stores instructions that can be executed by the at least one processor 1001, and the at least one processor 1001 may execute the instructions stored in the memory 1002 to perform the method for switching an operating mode of user equipment or the signal processing method for a network device in the foregoing descriptions. The processor 1001 may implement functions of the modules in the apparatus shown in FIG. 8 or FIG. 9.

The processor 1001 is a control center of the apparatus, and may connect all parts of the entire control device through various interfaces and lines, and implement various functions and data processing of the apparatus by running or executing the instructions stored in the memory 1002 and invoking data stored in the memory 1002, to perform overall monitoring on the apparatus.

In a possible design, the processor 1001 may include one or more processing units. The processor 1001 may integrate an application processor and a modem processor. The application processor mainly processes an operating system, a user interface, an application, and the like. The modem processor mainly processes wireless communication. It can be understood that the modem processor may alternatively not be integrated in the processor 1001. In some embodiments, the processor 1001 and the memory 1002 may be implemented on one chip. In some embodiments, the processor 1001 and the memory 1002 may alternatively be implemented separately on separate chips.

The processor 1001 may be a general-purpose processor, for example, a CPU, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in the embodiments of this application. The general-purpose processor may be a microprocessor or any conventional processor or the like. The steps of the method for switching an operating mode of user equipment or the signal processing method for a network device disclosed with reference to the embodiments of this application may be directly performed and completed by a hardware processor, or may be performed and completed by a combination of a hardware module and a software module in a processor.

As a non-volatile computer-readable storage medium, the memory 1002 may be configured to store non-volatile software programs, non-volatile computer-executable programs, and modules. The memory 1002 may include at least one type of storage medium, for example, may include a flash memory, a hard disk, a multimedia card, a memory card, a random access memory (RAM), a static random access memory (SRAM), a programmable read-only memory (PROM), a read-only memory (ROM), an electrically erasable programmable read-only memory (EEPROM), a magnetic memory, a magnetic disk, a compact disc, or the like. The memory 1002 is any other medium that can be used to carry or store desired program code in a form of an instruction or a data structure and that can be accessed by a computer, but is not limited thereto. The memory 1002 in this embodiment of this application may alternatively be a circuit or any other apparatus that can implement a storage function, and is configured to store program instructions and/or data.

Code corresponding to the method for switching an operating mode of user equipment or the signal processing method for a network device in the foregoing embodiments may be incorporated into a chip by designing and programming the processor 1001, so that the steps of the method for switching an operating mode of user equipment or the steps of the signal processing method for a network device in the embodiment shown in FIG. 4 can be performed when the chip runs. How to design and program the processor 1001 is a technology well known by a person skilled in the art. Details are not described herein.

Based on the same inventive concept, this application provides a communication system, including user equipment and a network device.

The user equipment is configured to: obtain a user equipment interconnection request sent by a network device; parse the user equipment interconnection request to obtain an expected operating mode message carrying an expected operating mode of the user equipment; if a message type corresponding to the expected operating mode message is different from a message type used when the user equipment is in a default operating mode, switch the user equipment from the default operating mode to the expected operating mode based on the expected operating mode message; and after the user equipment is switched to the expected operating mode, send an optical signal to the network device through a PON optical module, where the default operating mode is used to indicate that the user equipment uses uplink bandwidth in a time division multiplexing mode in a PON.

The network device is configured to: when the optical signal sent by the user equipment in the expected operating mode through the PON optical module is received directly through an optical fiber, perform, through an optical module of the network device, power processing on the received optical signal based on reception sensitivity of the optical module and then perform optical-to-electrical conversion, and send the user equipment interconnection request to the user equipment through the optical module.

Based on the same inventive concept, an embodiment of this application further provides a storage medium. The storage medium stores computer instructions. When the computer instructions are run on a computer, the computer is enabled to perform the method for switching an operating mode of user equipment or the signal processing method for a network device in the foregoing descriptions.

In some possible implementations, various aspects of the method for switching an operating mode of user equipment or the signal processing method for a network device provided in this application may be further implemented in a form of a program product, including program code. When the program product is run on an apparatus, the program code is used to enable the control device to perform the steps of the method for switching an operating mode of user equipment or the signal processing method for a network device according to various exemplary implementations of this application described in this specification.

It should be noted that although several units or subunits of the apparatus are mentioned in the foregoing detailed descriptions, such division is only exemplary and not mandatory. In practice, according to the embodiments of this application, the features and functions of two or more units described above may be embodied in one unit. Conversely, the features and functions of one unit described above may be further divided into a plurality of units for embodiment.

In addition, although the operations of the method of this application are described in a specific order in the accompanying drawings, this does not require or imply that these operations should be performed in the specific order, or that all the operations shown should be performed to achieve the desired result. Additionally or alternatively, some steps may be omitted, a plurality of steps may be combined into one step, and/or one step may be decomposed into a plurality of steps.

A person skilled in the art should understand that the embodiments of this application may be provided as a method, a system, or a computer program product. Therefore, this application may be implemented in a form of a hardware-only embodiment, a software-only embodiment, or an embodiment with a combination of software and hardware. In addition, this application may be implemented in a form of a computer program product that is implemented on one or more computer-usable storage media (including but not limited to a disk memory, a CD-ROM, an optical memory, and the like) that include computer-usable program code.

This application is described with reference to the flowcharts and/or the block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a server, so that the instructions executed by the computer or the processor of the other programmable data processing device generate an apparatus for implementing a specific function in one or more processes in the flowcharts and/or in one or more blocks in the block diagrams.

Program code for performing the operations in this application may be written by using one or more programming languages or any combination thereof. The programming languages include object-oriented programming languages such as Java and C++, and further include conventional procedural programming languages such as a "C" language or a similar programming language. The program code may be completely executed on a user computing apparatus, partially executed on user equipment, executed as a separate software package, partially executed on a user computing apparatus and partially executed on a remote computing apparatus, or completely executed on a remote computing apparatus or a server.

Alternatively, these computer program instructions may be loaded onto a computer or another programmable data processing device, so that a series of operations and steps are performed on the computer or the another programmable device, to generate computer-implemented processing. Therefore, the instructions executed on the computer or the other programmable device provide steps for implementing a specific function in one or more processes in the flowcharts and/or in one or more blocks in the block diagrams.

Clearly, a person skilled in the art may make various modifications and variations to this application without departing from the spirit and scope of this application. Therefore, this application is intended to cover these modifications and variations of this application provided that they fall within the protection scope defined by the following claims and equivalent technologies thereof.

What is claimed is:

1. A method for switching an operating mode of user equipment, comprising:
    obtaining a user equipment interconnection request sent by a network device;
    parsing the user equipment interconnection request to obtain an expected operating mode message carrying an expected operating mode of the user equipment; and
    when a message type corresponding to the expected operating mode message is different from a message type used when the user equipment is in a default operating mode, switching the user equipment from the default operating mode to the expected operating mode based on the expected operating mode message, wherein the default operating mode is used to indicate that the user equipment uses uplink bandwidth in a time division multiplexing mode in a passive optical network PON;
    wherein the switching the user equipment from the default operating mode to the expected operating mode comprises:
    switching an optical port of the user equipment from a PON mode to an Ethernet mode;
    enabling a media access control MAC address forwarding capability of the user equipment; and
    indicating a PON optical module of the user equipment to be in a light-emitting state.

2. The method according to claim 1, wherein the determining that the message type corresponding to the expected operating mode message is different from the message type used when the user equipment is in the default operating mode comprises:
    when a message protocol type corresponding to the expected operating mode message is different from a message protocol type used when the user equipment is in the default operating mode, determining that the message type corresponding to the expected operating mode message is different from the message type used when the user equipment is in the default operating mode.

3. The method according to claim 2, wherein the message protocol type corresponding to the expected operating mode message is a non-multi-point control protocol MPCP type, and the message protocol type used when the user equipment is in the default operating mode is an MPCP type.

4. The method according to claim 1, wherein when the following conditions are met, it is determined that the user equipment is in the default operating mode:
    the optical port of the user equipment is in the PON mode; and
    the PON optical module of the user equipment is in the non-light-emitting state.

5. The method according to claim 1, wherein the method further comprises:
    when it is determined that the user equipment receives an optical signal sent by the network device, continually recording an MPCP message reception status of the user equipment; and
    when the MPCP message reception status indicates that the user equipment receives no MPCP message sent by the network device within a specified time range, switching the user equipment from the default operating mode to the expected operating mode.

6. The method according to claim 1, wherein after the switching the user equipment from the default operating mode to the expected operating mode, the method further comprises:
    switching the user equipment from the expected operating mode to the default operating mode in response to an operating mode initialization operation of the user equipment; or
    when it is determined that the user equipment detects that the network device sends an MPCP message, switching the user equipment from the expected operating mode to the default operating mode.

7. The method according to claim 6, wherein the switching the user equipment from the expected operating mode to the default operating mode comprises:
    sending an access registration request to the network device, and receiving an access registration response returned by the network device based on the access registration request; and
    when the access registration response indicates that the user equipment is successfully registered with the network device, switching the user equipment from the expected operating mode to the default operating mode.

8. The method according to claim 1, wherein the method further comprises:
    when the user equipment is in the default operating mode, indicating an optical splitter to attenuate an optical signal transmitted by the PON optical module of the user equipment and then send the optical signal to the network device.

9. The method according to claim 1, wherein the method further comprises:
    when the user equipment is in the expected operating mode, sending, to the network device directly through an optical fiber, an optical signal transmitted by the PON optical module of the user equipment.

10. An electronic device, comprising a memory, a processor, and a computer program stored in the memory and capable of running in the processor, wherein when the processor executes the computer program, the method according to claim 1 is implemented.

11. A non-transitory computer-readable storage medium, comprising program code, wherein when the program code is run, the program code is used to implement the method according to claim 1.

12. A signal processing method for a network device, comprising:
    sending a user equipment interconnection request to a user equipment, wherein the user equipment interconnection request carries an expected operating mode message, and the user equipment is configured to, when the user equipment obtains the user equipment interconnection request, and in response to that a message type corresponding to the expected operating mode message is different from a message type used when the user equipment is in a default operating mode, switch the user equipment from the default operating mode to the expected operating mode based on the expected operating mode message, wherein the user equipment is configured to:

switch an optical port of the user equipment from a PON mode to an Ethernet mode;

enable a media access control MAC address forwarding capability of the user equipment; and indicate a PON optical module of the user equipment to be in a light-emitting state;

receiving an optical signal sent by user equipment in the expected operating mode through the PON optical module; and performing, by an optical module of the network device, power processing on the received optical signal based on reception sensitivity of the optical module and then performing optical-to-electrical conversion, wherein the expected operating mode is different from the default operating mode of the user equipment, and the default operating mode is used to indicate that the user equipment uses uplink bandwidth in a time division multiplexing mode in a passive optical network PON.

13. The method according to claim 12, wherein the performing, by the optical module of the network device, the power processing on the received optical signal based on the reception sensitivity of the optical module comprises:

performing power attenuation on the optical signal until power of the optical signal falls within a range of the reception sensitivity.

14. The method according to claim 12, wherein before the receiving the optical signal sent by the user equipment in the expected operating mode through the PON optical module, the method further comprises:

sending a user equipment interconnection request to the user equipment, wherein the user equipment interconnection request carries an expected operating mode message for the expected operating mode of the user equipment, and a message type corresponding to the expected operating mode message is different from a message type used when the user equipment is in the default operating mode.

15. The method according to claim 14, wherein that the message type corresponding to the expected operating mode message is different from the message type used when the user equipment is in the default operating mode comprises:

when a message protocol type corresponding to the expected operating mode message is different from a message protocol type used when the user equipment is in the default operating mode, determining that the message type corresponding to the expected operating mode message is different from the message type used when the user equipment is in the default operating mode.

16. An electronic device, comprising a memory, a processor, and a computer program stored in the memory and capable of running in the processor, wherein when the processor executes the computer program, the method according to claim 12 is implemented.

17. A non-transitory computer-readable storage medium, comprising program code, wherein when the program code is run, the program code is used to implement the method according to claim 12.

18. An optical module, wherein the optical module is mounted in a network device, and the optical module is connected to user equipment in an expected operating mode directly through an optical fiber, the optical module is configured to send a user equipment interconnection request to the user equipment, wherein the user equipment interconnection request carries an expected operating mode message, and the user equipment is configured to, when the user equipment obtains the user equipment interconnection request, and in response to that a message type corresponding to the expected operating mode message is different from a message type used when the user equipment is in a default operating mode, switch the user equipment from the default operating mode to the expected operating mode based on the expected operating mode message, wherein the user equipment is configured to:

switch an optical port of the user equipment from a PON mode to an Ethernet mode;

enable a media access control MAC address forwarding capability of the user equipment; and indicate a PON optical module of the user equipment to be in a light-emitting state;

the optical module is configured to: when an optical signal sent by the user equipment through the PON optical module is received, perform power processing on the received optical signal based on reception sensitivity of the optical module and then perform optical-to-electrical conversion, wherein the expected operating mode is different from the default operating mode of the user equipment, and the default operating mode is used to indicate that the user equipment uses uplink bandwidth in a time division multiplexing mode in a passive optical network PON.

* * * * *